United States Patent
Hung et al.

(10) Patent No.: US 11,755,399 B1
(45) Date of Patent: Sep. 12, 2023

(54) BIT ERROR RATE REDUCTION TECHNOLOGY

(71) Applicant: MACRONIX INTERNATIONAL CO., LTD., Hsinchu (TW)

(72) Inventors: Shuo-Nan Hung, Hsinchu (TW); Chun-Hsiung Hung, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 17/752,502

(22) Filed: May 24, 2022

(51) Int. Cl.
*G06F 11/07* (2006.01)
*G06F 11/10* (2006.01)
*G06F 3/06* (2006.01)

(52) U.S. Cl.
CPC ............ *G06F 11/076* (2013.01); *G06F 3/065* (2013.01); *G06F 3/0619* (2013.01); *G06F 3/0656* (2013.01); *G06F 11/1044* (2013.01); *G06F 3/0685* (2013.01)

(58) Field of Classification Search
CPC ............... G06F 11/076; G06F 11/1044; G06F 11/1048; G06F 3/0619; G06F 3/065; G06F 3/0656
See application file for complete search history.

(56) References Cited

U.S. PATENT DOCUMENTS

| | | | |
|---|---|---|---|
| 8,599,613 B2 | 12/2013 | Abiko et al. | |
| 8,661,294 B2 | 2/2014 | Lee et al. | |
| 10,297,336 B2 | 5/2019 | Hong et al. | |
| 10,318,168 B2 | 6/2019 | Lea et al. | |
| 10,403,352 B2 | 9/2019 | Hush et al. | |
| 2018/0205396 A1* | 7/2018 | Ikegawa | G06F 11/1048 |

OTHER PUBLICATIONS

Jamshidi et al., MagCim: A Flexible and non-Volatile computing-in-memory processor for energy-efficient logic computation, IEEE Access, vol. 10, Mar. 16, 2022, pp. 35445 to 35459.*
Hamdioui et al., Applications of computation-in-memory architectures based on memristive devices, IEEE, 2019, pp. 486 to 491.*
John Reuben, Rediscovering majority logic in the post-CMOS Era: A perspective from in-memory computing, Journal of low power Electronics and Applications, 2020, pp. 1 to 15.*

* cited by examiner

*Primary Examiner* — Shelly A Chase
(74) *Attorney, Agent, or Firm* — Andrew L. Dunlap; HAYNES BEFFEL & WOLFELD LLP (57) ABSTRACT

An IC is provided and includes a memory array, an address register holding at least one address of a securely stored file and configured to output three or more addresses of the securely stored filed and computation-in-memory (CIM) logic coupled with the memory array. The CIM logic is configured to perform a majority function on three or more bits of the securely stored file, wherein the three or more bits are redundantly stored in three or more different locations in the memory array and wherein the three locations are associated with the three or more addresses in the memory array.

19 Claims, 7 Drawing Sheets

|  |  |  |  | 310 | 320 | 330 | 340 | 350 | 360 | 370 |
|---|---|---|---|---|---|---|---|---|---|---|
| Loc 1 | Loc 2 | Loc 3 | MRCD | D1 | D2 | D3 | D1 | D2 | D2 | D1 |
| 0 | 0 | 0 | 0 | 0 | 0 | 1 | 0 | 0 | 0 | 0 |
| 0 | 0 | 1 | 0 | 0 | 0 | 1 | 0 | 1 | 0 | 0 |
| 0 | 1 | 0 | 0 | 0 | 1 | 0 | 0 | 0 | 0 | 0 |
| 0 | 1 | 1 | 1 | 0 | 1 | 0 | 0 | 1 | 1 | 1 |
| 1 | 0 | 0 | 0 | 1 | 0 | 0 | 0 | 0 | 0 | 0 |
| 1 | 0 | 1 | 1 | 1 | 0 | 0 | 0 | 1 | 1 | 1 |
| 1 | 1 | 0 | 1 | 1 | 1 | 1 | 1 | 0 | 0 | 1 |
| 1 | 1 | 1 | 1 | 1 | 1 | 1 | 1 | 1 | 0 | 1 |

| Uncorrected BER | Corrected BER |
|---|---|
| 1.00E-01 | 2.80E-02 |
| 1.00E-02 | 2.98E-04 |
| 1.00E-03 | 3.00E-06 |
| 1.00E-04 | 3.00E-08 |
| 1.00E-05 | 3.00E-10 |
| 1.00E-06 | 3.00E-12 |
| 1.00E-07 | 3.00E-14 |
| 1.00E-08 | 3.00E-16 |
| 1.00E-09 | 3.00E-18 |

BIT ERROR RATE REDUCTION TECHNOLOGY

BACKGROUND

Field

The disclosed technology relates to memory integrated circuits (ICs), and in particular to reducing the bit-error rate (BER) in read data.

Description of Related Art

The bit-error rate (BER) of memory chips gets higher with more advanced technology nodes. Existing products use advanced error detection and correction technology, and retry reading with different read condition to restore corrupted data.

However, some data may not be recovered if there are too many error bits. This cannot be accepted for important data such as for an operating system, and additional copies of the data may be used to enhance the data integrity.

In computing-in-memory (CIM) applications, certain compute operations are performed inside a memory chip. Without an internal error correction code (ECC) circuit to correct the data, the CIM application is hampered by high data error rates.

SUMMARY

In a first aspect, the disclosed technology provides an integrated circuit (IC) comprising a memory array coupled with computation-in-memory (CIM) logic. The memory has one or more arrays of memory cells. The CIM logic performs a majority function on three or more bits redundantly stored in the memory array to obtain error-corrected data. The CIM logic may include combinational logic to perform the majority function.

The IC may further include an I/O interface, a page buffer including a first bit data buffer, a second bit data buffer, and a third bit data buffer. The CIM logic can include logic circuitry to perform at least parts of the majority function on bits stored in the first bit data buffers, the second bit data buffer, and/or the third bit data buffers, wherein the first bit data buffers D1 of the multiple bitwise buffer cells jointly form a first data buffer, the second bit data buffers of the multiple bitwise buffer cells jointly form a second data buffer, and the third bit data buffers of the multiple bitwise buffer cells jointly form a third data buffer. Further, the IC can include control circuits coupled with the input/output interface, the memory array, and the page buffer, and configured to receive control signals from the input/output interface, and in response to a read data redundantly control signal, read data from the three or more different locations in the memory array, and perform the majority function on the data read from the three or more different locations to obtain error-corrected data, and copy the error-corrected data to the input/output interface or using the error-corrected data for a new CIM logic operation.

In an embodiment, the control circuits can be configured to, in response to a "write data redundantly" control signal, copy data from the input/output interface to each of the three or more different locations in the memory array.

In a further embodiment, the control circuits can be configured to, in response to the read data redundantly control signal, perform the majority function to provide error-corrected data.

In a further embodiment, the IC can include a cache memory coupled between the page buffer and the input/output interface.

In an embodiment, the control circuits can be configured to output signals to cause the CIM logic perform operations including reading data from a first location in the memory array and storing the data read from the first location in the first data buffer, reading data from a second location in the memory array and storing the data read from the second location in the second data buffer, performing a bitwise XNOR operation on the data stored in the first data buffer and the data stored in the second data buffer, and storing data resulting from the bitwise XNOR operation in the third data buffer, performing a first bitwise AND operation on the data stored in the third data buffer and the data stored in the first data buffer, and storing data resulting from the first bitwise AND operation in the first data buffer, reading data from a third location in the memory array and storing the data read from the third location in the second data buffer, performing a second bitwise AND operation on the data stored in the second data buffer and inverted bits from the data stored in the third data buffer and storing data resulting from the second bitwise AND operation in the second data buffer, and performing a bitwise OR operation on the data stored in the first data buffer and the data stored in the second data buffer, and using data resulting from the bitwise OR operation as the error-corrected data.

In another embodiment, the control circuits be configured to output signals to cause the CIM logic perform operations including reading data from a first location in the memory array and storing the data read from the first location in the first data buffer, reading data from a second location in the memory array and storing the data read from the second location in the second data buffer, performing a bitwise XNOR operation on the data stored in the first data buffer and the data stored in the second data buffer, and storing data resulting from the bitwise XNOR operation in the third data buffer, reading data from a third location in the memory array and storing the data read from the third location in the second data buffer, performing a first bitwise AND operation on the data stored in the third data buffer and the data stored in the first data buffer, and storing data resulting from the first bitwise AND operation in the first data buffer, performing a second bitwise AND operation on the data stored in the second data buffer and inverted bits from the data stored in the third data buffer, and storing data resulting from the second bitwise AND operation in the second data buffer, and performing a bitwise OR operation on the data stored in the first data buffer and the data stored in the second data buffer, and using data resulting from the bitwise OR operation as the error-corrected data.

In an embodiment, a method of redundantly storing data in a memory array of an integrated circuit (IC) is provided. The memory array can include one or more arrays of memory cells, the IC can include an address register and computation-in-memory (CIM) logic coupled with the memory array. The method can include holding, in the address register, at least one address of a securely stored file, outputting, by the address register, three or more addresses of the securely stored file, and implementing the CIM logic to perform a majority function on three or more bits of the securely stored file to redundantly store the three or more bits in the memory array in three or more different locations, associated with the three or more addresses, in the memory array.

In a further embodiment the method can include reading data from a first location in the memory array and storing the data read from the first location in a first data buffer, reading data from a second location in the memory array and storing the data read from the second location in a second data buffer, performing a bitwise XNOR operation on the data stored in the first data buffer and the data stored in the second data buffer, and storing data resulting from the bitwise XNOR operation in a third data buffer, performing a first bitwise AND operation on the data stored in the third data buffer and the data stored in the first data buffer, and storing data resulting from the first bitwise AND operation in the first data buffer, reading data from a third location in the memory array and storing the data read from the third location in the second data buffer, performing a second bitwise AND operation on the data stored in the second data buffer and inverted bits from the data stored in the third data buffer and storing data resulting from the second bitwise AND operation in the second data buffer, and performing a bitwise OR operation on the data stored in the first data buffer and the data stored in the second data buffer, and using data resulting from the bitwise OR operation as the error-corrected data.

In another embodiment, the method can include reading data from a first location in the memory array and storing the data read from the first location in a first data buffer, reading data from a second location in the memory array and storing the data read from the second location in a second data buffer, performing a bitwise XNOR operation on the data stored in the first data buffer and the data stored in the second data buffer, and storing data resulting from the bitwise XNOR operation in a third data buffer, reading data from a third location in the memory array and storing the data read from the third location in the second data buffer, performing a first bitwise AND operation on the data stored in the third data buffer and the data stored in the first data buffer, and storing data resulting from the first bitwise AND operation in the first data buffer, performing a second bitwise AND operation on the data stored in the second data buffer and inverted bits from the data stored in the third data buffer, and storing data resulting from the second bitwise AND operation in the second data buffer, and performing a bitwise OR operation on the data stored in the first data buffer and the data stored in the second data buffer, and using data resulting from the bitwise OR operation as the error-corrected data.

Other aspects and advantages of the disclosed technology can be seen on review of the drawings, the detailed description and the claims, which follow.

DETAILED DESCRIPTION

Terminology

As used herein, the phrase "one of" should be interpreted to mean exactly one of the listed items. For example, the phrase "one of A, B, and C" should be interpreted to mean any of: only A, only B, or only C.

As used herein, the phrases "at least one of" and "one or more of" should be interpreted to mean one or more items. For example, the phrase "at least one of A, B, and C" or the phrase "at least one of A, B, or C" should be interpreted to mean any combination of A, B, and/or C.

Unless otherwise specified, the use of ordinal adjectives "first", "second", "third", etc., to describe an object, merely refers to different instances or classes of the object, and does not imply any ranking or sequence.

BER—Bit-error rate.

Block—as used in this document, a block (of memory) is the smallest unit for erase operations. A block of memory may comprise multiple pages of memory.

CIM—Computation in memory.

DRAM—Dynamic RAM.

ECC—Error correction code.

IC—integrated circuit—this may be a monolithically integrated circuit, i.e., a single semiconductor die that includes a circuit, or it may be a multichip module that includes multiple semiconductor dies in a single package and that may further include a substrate onto which the dies are mounted, and further electronic devices. In some implementations, an IC may include a printed circuit board with various discrete and integrated devices to jointly provide the functions as described herein.

MRC—Majority rule check

MRCD—Majority rule check data.

NAND Flash—a nonvolatile memory architecture that includes memory circuits resembling NAND gates.

NOR Flash—a nonvolatile memory architecture that includes memory circuits resembling NOR gates.

NVRAM—non-volatile RAM.

Page—as used in this document, "page" can be used to refer to the smallest addressable unit of memory for read and program operations.

PCRAM—phase-change RAM.

RAM—random-access memory.

ROM—Read-only memory.

SRAM—Static RAM.

Implementations

Figure 1:
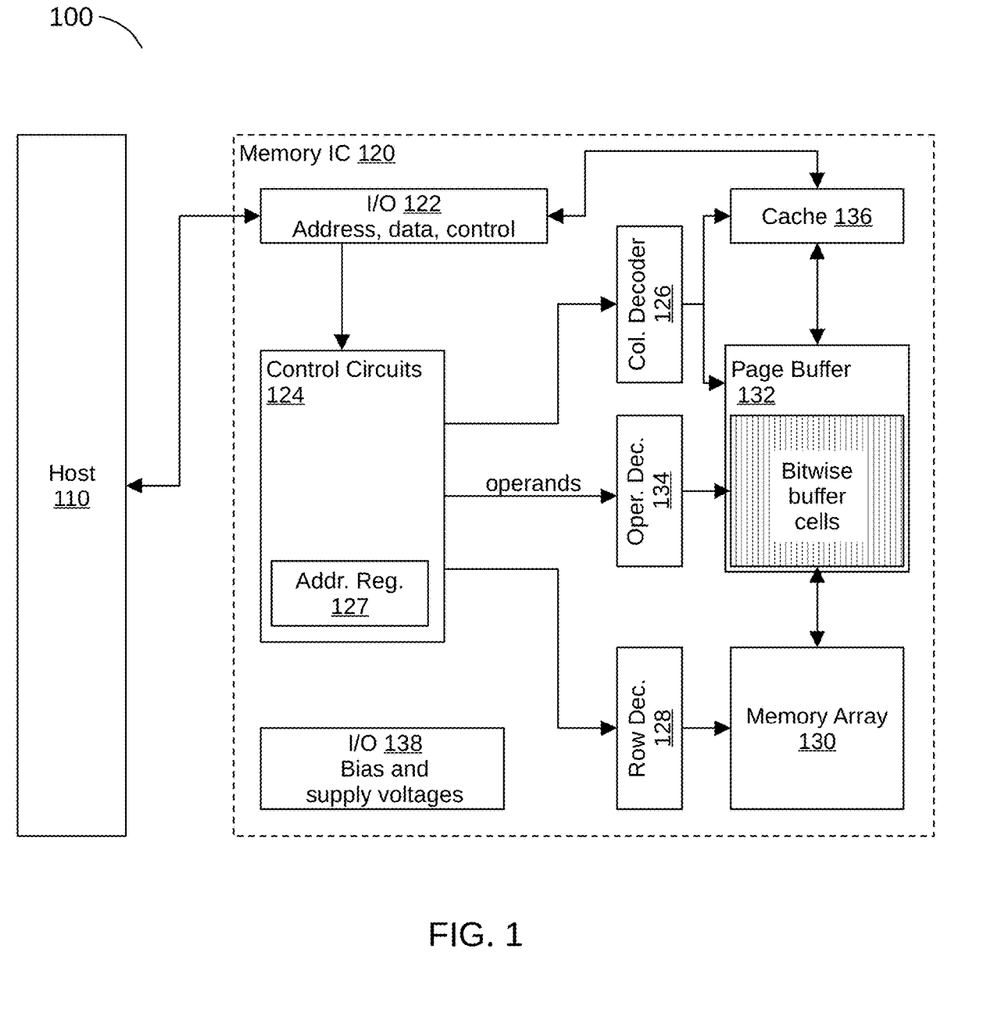
FIG. 1 is a simplified diagram of a memory system that includes a host and a memory IC.

FIG. 1 is a simplified diagram of a memory system 100 that includes a host 110 and a memory IC 120. The example memory system includes circuits for BER reduction as described herein.

Host 110 can comprise a general-purpose processor, a special-purpose processor, a processor configured as a memory controller, or other processor that uses memory IC 120. In some implementations, all or part of host 110 can be implemented on the same integrated circuit as the memory.

Host 110 can use one or more file systems to store, retrieve, and update data stored in the memory based on requests from an application program or multiple application programs. In general, host 110 can also execute software programs that perform memory management functions and other functions that can produce status information for data stored in the memory, including information marking data invalid as a result of such functions. Such functions can include, for example, wear leveling, bad block recovery, power loss recovery, garbage collection, error correction, and so on. Also, host 110 can execute application programs, use file systems, flash translation layer programs and other components that can produce status information for data stored in memory IC 120, including information marking data invalid as a result of such functions.

Memory IC 120 can be implemented on a single integrated circuit chip, on a multichip module, or on multiple chips configured as suits a particular need. In some implementations, memory IC 120 may include various types of volatile and non-volatile memory cells, including SRAM, DRAM, NVRAM, PCRAM, NAND Flash, NOR Flash, and so on.

Memory IC 120 includes input/output interface 122, control circuits 124, column decoder 126, row decoder 128, memory array 130, page buffer 132, operation decoder 134, and cache memory 136. Page buffer 132 includes bitwise buffer cells as will be further described with reference to FIG. 2. A bias circuit 138 generates supply voltages and/or currents as needed for operation of memory IC 120. Operation decoder 134, which may receive operands from or via control circuits 124 and decodes these into control signals for the bitwise buffer cells, may be located as drawn, or inside control circuits 124, or inside page buffer 132. Control circuits 124 may further include address register 127, which can store one or more addresses used for the BER reduction methods described herein. Address register 127 may be configured to hold at least one address of a securely stored file. It may further be configured to output three or more addresses of the securely stored file. Address register 127 may be combined with other functionality, such as counters to output a series of subsequent or staggered addresses for row decoder 128, which provides block addresses to memory array 130. In some implementations, address register 127 may be located inside control circuits 124 as drawn. In other implementations, address register 127 may be located elsewhere in memory IC 120.

Memory array 130 can include a two-dimensional or three-dimensional array of memory cells. Memory array 130 includes a plurality of blocks of memory cells. The blocks of memory cells include sets of memory cells that fall within a specified range of addresses in the memory array and can be said to have block addresses. In some implementations of flash memory, erase operations are executed on sectors in the memory array that can be partitioned electrically during the erase operation from other sectors. Blocks of memory cells can encompass a single sector, and thus may be referred to as an erase block.

Memory array 130 can comprise memory cells configured to store one or more bits per cell. In other examples, the memory cells may comprise programmable resistance memory cells, phase change memory cells, and other types of nonvolatile and volatile memory cell technologies.

Input/output interface 122 receives addresses and control signals from host 110, and exchanges data with host 110 via a shared address/data bus. Input/output interface 122 may include one or more parallel and/or serial interfaces. Internally, it provides control information and addresses to control circuits 124, whereas it exchanges data with cache memory 136 and/or page buffer 132.

The control signals may include a chip select signal, a write signal, a read signal, and other information. In some examples, host 110 can be coupled to memory IC 120 using a serial bus technology, using shared address and data lines.

Input/output interface 122 provides communication paths for the data with destinations external to memory IC 120. Input/output data and control signals are moved between input/output interface 122 and control circuits 124. In some implementations, other data sources internal or external to memory IC 120 can be included such as a general-purpose processor or special-purpose application circuitry, or a combination of modules providing system-on-a-chip functionality supported by memory array 130.

Control circuits 124 may implement a command decoder and controller modules. Control circuits 124 receive addresses from host 110, and provides (partial) addresses to row decoder 128 and column decoder 126. It receives commands from host 110 via input/output interface 122 and is configured to control all other circuits in memory IC 120 as needed to execute the commands. Upon a query by host 110, it can also provide status information via input/output interface 122 to host 110. The commands may include commands for all aspects of the operation of memory IC 120, including opcodes and operands for CIM circuits included in page buffer 132. The commands may include commands to write a page of data into memory array 130; to redundantly write a page of data into memory array 130 at three different locations; to read a page of data from memory array 130 and store it in a data buffer; to read a page of data from memory array 130, perform an operation on the data read and data stored in a data buffer, and store the result in a data buffer; to read three pages of redundantly stored data from memory array 130 and perform a majority function on bits in the three pages to obtain a page of improved BER data; to perform a majority function on any three (or more) bits available to page buffer 132; and any other command for functions described herein or known in the art.

In the example shown in FIG. 1, control circuits 124 include control modules implementing a bias arrangement state machine, or machines, which controls, or control, the application of supply voltages and currents generated in or provided through bias circuit 138, such as read, erase, verify and program voltages including pre-charge voltages, for a set of selectable program and read operations, dependent on the type of memory cells in memory array 130. Supply voltages are applied to memory array 130.

Control circuits 124 can include modules implemented using special-purpose logic circuitry including state machines, as known in the art. In alternative implementations, control circuits 124 can include modules implemented using a processor, which can be implemented on the same integrated circuit, which execute a computer program to control the operations of memory IC 120. In yet other implementations, a combination of special-purpose logic circuitry and a general-purpose processor can be utilized for implementation of functions in control circuits 124.

Row decoder 128 has an address input coupled with control circuits 124, and word line outputs coupled to memory array 130. Row decoder 128 may receive a row address, for example as a binary number, from control circuits 124, and decode it to a one-hot encoded number, whose bits can each control one bock selection line for memory array 130. Column decoder 126 has an address input coupled with control circuits 124, and bitline outputs coupled to page buffer 132. Column decoder 126 may receive a column address, for example as a binary number, from control circuits 124 and decode it to a number whose digits can select one or more bitwise buffer cells in page buffer 132. Column decoder 126 may further be coupled with cache memory 136, in which the number's bits can select one or more columns of data. In a NAND flash implementation, a row address may be divided into block address (which may include a subblock) and a page address (WL). The page address may be sent to bias circuit 138 to decode and generate the WL bias. For example, if WLn is selected for a read operation, the bias for WLn is Vread, and the bias for other page addresses is Vpass.

Page buffer 132 is coupled to a plurality of bit lines arranged along columns in memory array 130 for reading data from and writing data to memory array 130. In one implementation, the page buffer can be the same width as the memory array. Page buffer 132 is coupled with memory array 130 and with cache memory 136 for the exchange of pages of memory data. Page buffer 132 may store three or more pages of data. In a write operation, input/output interface 122 may supply data from host 110 to cache memory 136, which may in turn forward it to page buffer 132 and/or memory array 130. In a read operation, data from page buffer 132 may be supplied to cache memory 136, which in turn is coupled with input/output interface 122.

Page buffer 132 includes CIM logic that may execute compute operations used for error correction for parts or all of stored memory data. For example, when memory array 130 must store a data file with extra high data integrity, the implementation may redundantly store the data file in three different locations. Address register 127 may hold a base address for one of the three locations and control circuits 124 may determine the other two base addresses by using a fixed offset, or address register 127 may hold base addresses for each of the three locations. Host 110 may issue a "write data redundantly" command to memory IC 120, and in response, control circuits 124 may provide a series of staggered addresses to row decoder 128 to write the data in pages starting at the three base addresses for the three different locations. In some implementations, host 110 may simply write the file to the first location, then to the second location, and then to the third location.

When reading the file, in a page-by-page fashion, an implementation may, in response to a "read data redundantly" control signal, read a plurality of data bits from each of its three locations and CIM logic in page buffer 132 can perform bitwise majority rule checks on the uncorrected memory data to calculate corrected memory data based on a majority of the received bits. For example, one bit of memory data is simultaneously stored in three different locations in memory array 130. The three stored versions of the bit are read back from the three locations, and the CIM logic compares the three versions. If a majority (i.e., at least 2 of the 3) is "0" then the CIM logic computes a "0", and if a majority is "1", then the CIM logic computes a "1". This operation is performed for all redundantly stored bits, and the CIM logic outputs the error corrected data to cache memory 136 (or uses the error corrected data for other CIM tasks). The CIM logic may provide the error correction in several steps using general bitwise logic circuitry, as described with reference to FIGS. 3-7, or in a single step using dedicated bitwise logic, such as described with reference to FIG. 8.

Figure 2:
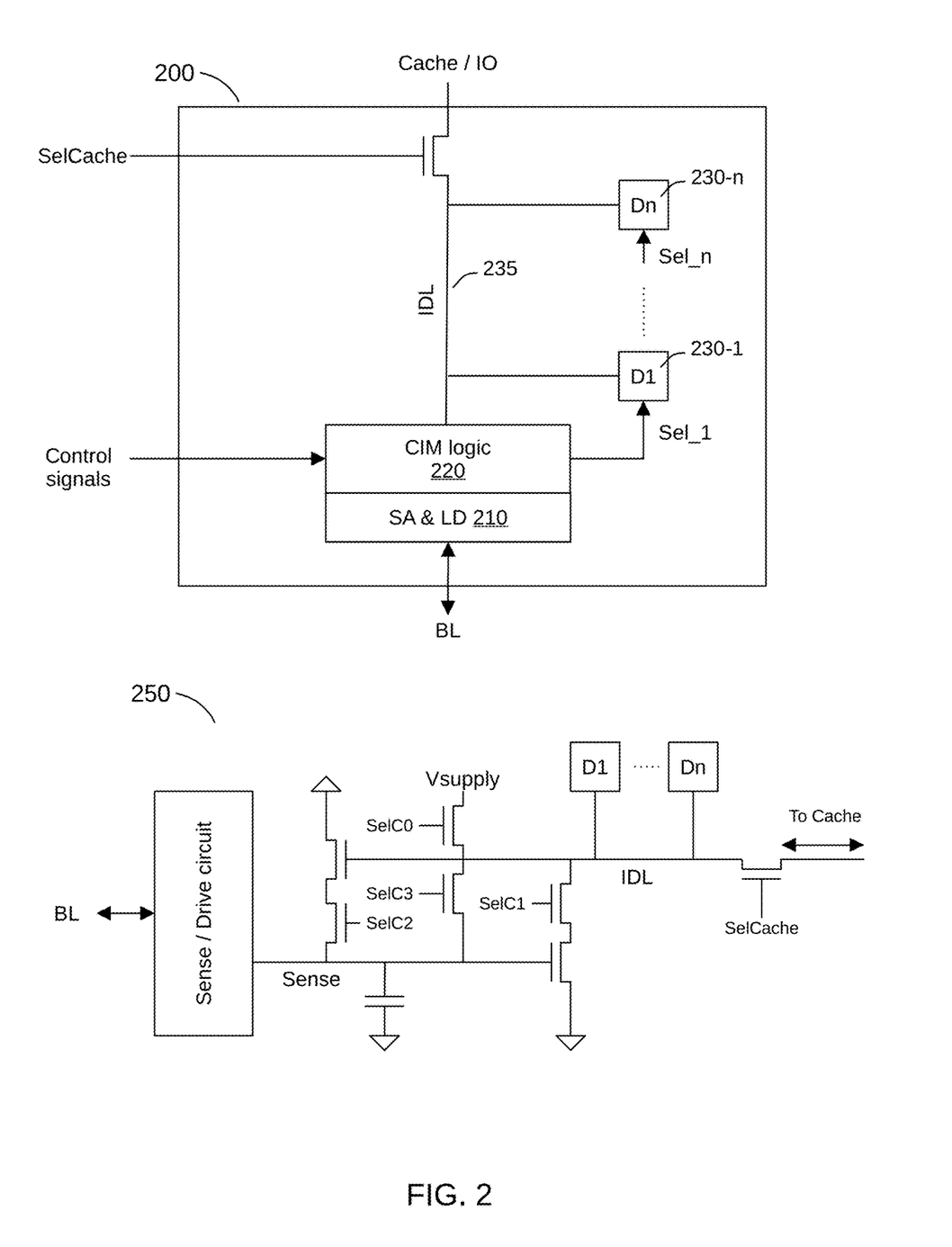
FIG. 2 shows an example one-bit wide buffer cell used in the data path in the page buffer.

FIG. 2 shows an example (one bit wide) bitwise buffer cell 200 used in the data path in page buffer 132. Page buffer 132 may include many parallel instances of the depicted bitwise buffer cell 200. A bitline BL provides a bidirectional interface with memory array 130. It is coupled with sense circuit and line driver 210, which may include a sense amplifier for signals received from memory array 130, and circuitry to drive bitline BL. CIM logic 220 receives control signals from operation decoder 134 or control circuits 124. Based on the control signals, it can move a data bit via the internal data line (IDL 235) between bitline BL, the cache or I/O interface, and any of the bit data buffers 230 (D1 ... Dn). It may further perform a logic operation, or a sequence of logic operations, on the data bit. The circuit 250 gives more details about an implementation of CIM logic 220, in which the signals SelC0-SelC3 and SelCache are included in the control signals. The bit data buffers 230 each include a memory circuit, such as a latch, that is capable of storing the data bit. The signals to select each of the bit data buffers has not been drawn, but may also be included in the control signals.

In an example, when writing data to memory array 130, CIM logic 220 may simply pass a data bit received from input/output interface 122 to memory array 130 via bitline BL. It may store the data bit received from input/output interface 122 in any one of the bit data buffers 230 before or while passing it on to bitline BL. It could perform a logical operation on the data bit received from input/output interface 122 with a bit stored in D1 (or in any of the other bit data buffers 230). When reading a data bit from memory, bitwise buffer cell 200 may pass it on from sense circuit and line driver 210 to cache memory 136. Or it could store the data bit in one of the bit data buffers 230, perform one or more operations on it, and write the result back into memory array 130. All such operations are in response to the control signals received from control circuits 124.

Figure 3:
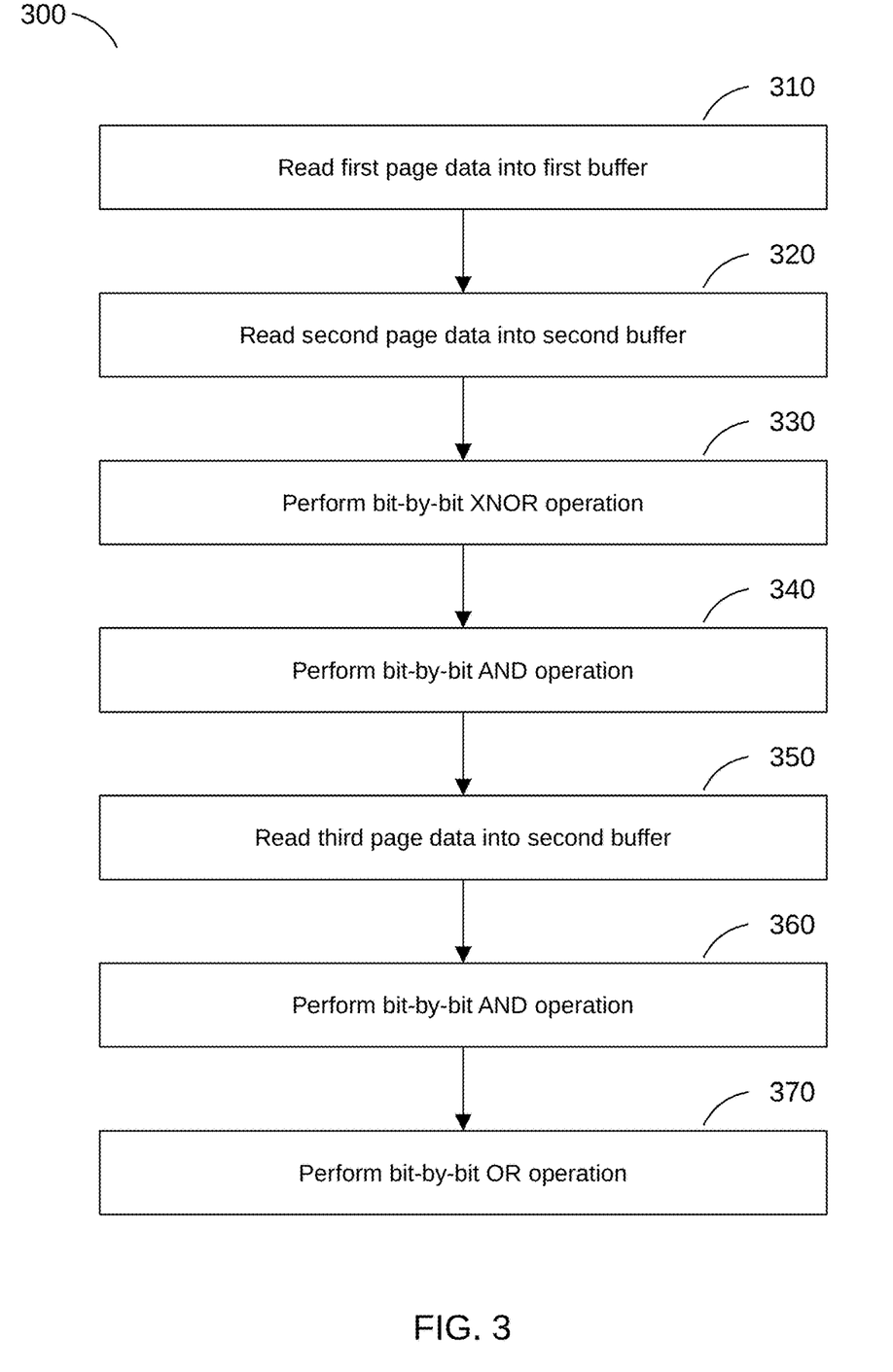
FIG. 3 illustrates a method to reduce the BER in the memory IC of FIG. 1.

FIG. 3 illustrates a method 300 to reduce the BER in the memory IC 120 of FIG. 1. The example method is used in page buffer that includes three data buffers: a first data buffer (L1), a second data buffer (L2) and a third data buffer (L3). The first data buffer L1 may include all or a selection of bit data buffers D1 in the one-bit wide buffer cells in the page buffer. The second data buffer L2 may include all or a selection of bit data buffers D2 in the one-bit wide buffer cells in the page buffer, etc. Method 300 comprises the following steps:

Step 310—reading first page data into the first data buffer L1. The implementation reads the first page data from a first location in memory array 130.

Step 320—reading second page data into the second data buffer L2. The implementation reads the second page data from a second location in memory array 130.

Step 330—performing a bitwise XNOR operation on the data stored in the first data buffer L1 and the data stored in the second data buffer L2, and storing the result of the bitwise XNOR operation in the third data buffer L3. Thus, for each bit bx:

$$b3=\text{XNOR}(b1,b2)$$

Step 340—performing a bitwise AND operation on the result stored in the third data buffer L3 and the first page data stored in the first data buffer L1, and storing the result of the bitwise AND operation in the first data buffer L1. Thus, for each bit bx:

$$b1=\text{AND}(b1,b3)$$

Step 350—reading third page data into the second data buffer L2. The implementation reads the third page data from a third location in memory array 130.

Step 360—performing a bitwise AND operation on the third page data from the second data buffer L2 and inverted bits from the values stored in the third data buffer L3, and storing the result of the bitwise AND operation in the second data buffer L2. Thus, for each bit bx:

$$b2=\text{AND}(b2,\text{NOT}(b3))$$

Step 370—performing a bitwise OR operation on the result of the bitwise AND operation stored in the first data buffer L1 and the result of the bitwise AND operation stored in the second data buffer L2, and storing the result in the first data buffer L1. The result of the OR operation represents the error-corrected data obtained from performing the majority function. Thus, for each bit bx:

$$b1=OR(b1,b2)$$

Some implementations may store results in different data buffers than shown in the above steps, and other implementations may skip intermediate storage and retrieve values from memory directly.

Figure 4:
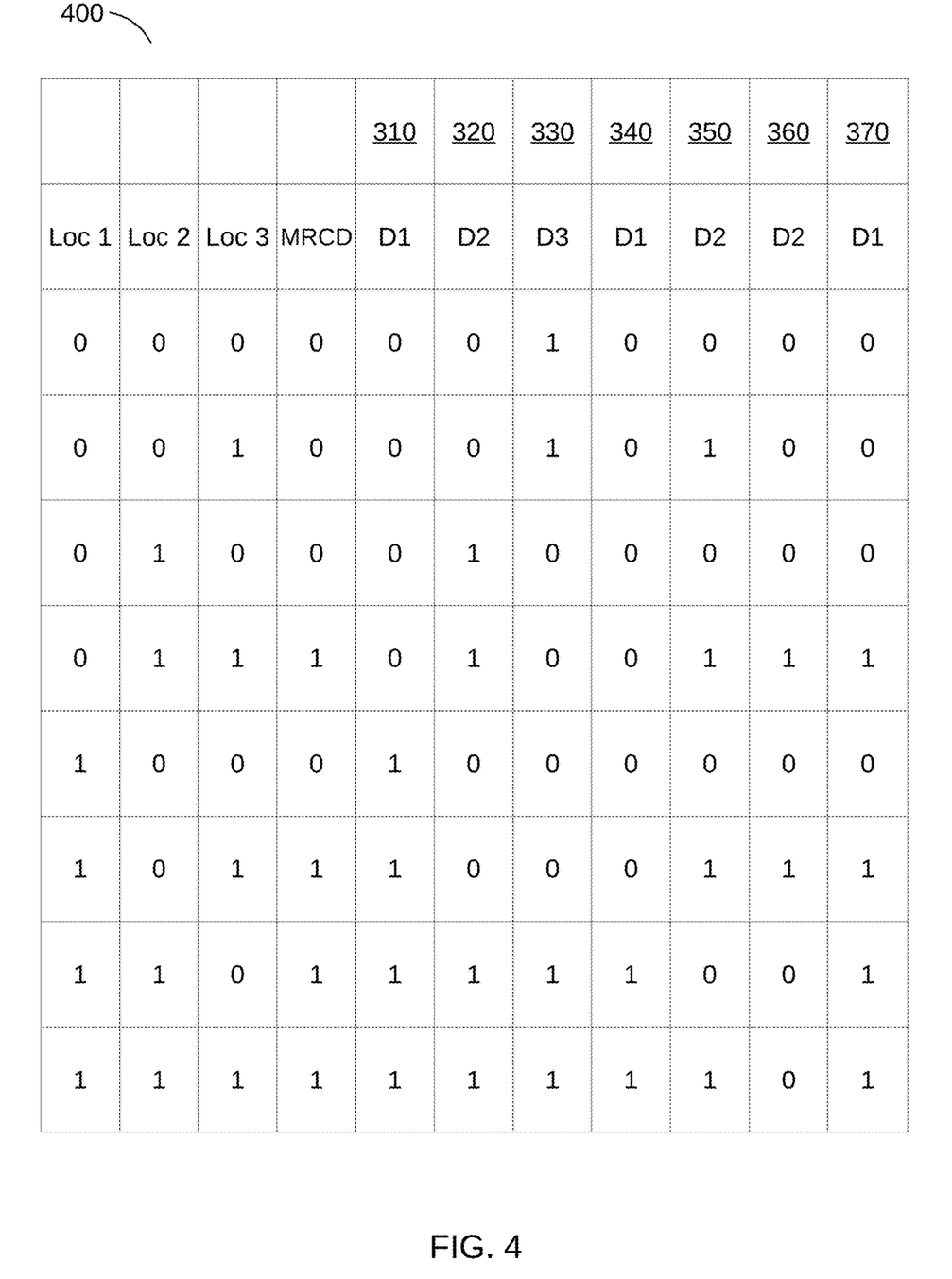
FIG. 4 shows a truth table for the steps in the method of FIG. 3.

FIG. 4 shows a truth table 400 for the steps in method 300 of FIG. 3. Truth table 400 includes three columns showing the data in the first, second, and third location in memory array 130, i.e., Loc 1, Loc 2, and Loc 3, respectively. It next shows a column with the majority rule check data MRCD. It further includes seven columns showing the results of Step 310 through Step 370, respectively, with the respective bit data buffers in which the results are stored (D1, D2, and D3). Since method 300 is a bitwise method, truth table 400 shows the result for one bit, read from the first, second, and third locations (Loc 1, Loc 2, and Loc 3). Eight combinations are possible for values read from the three locations, and truth table 400 shows each of those combinations. The results of Step 370 match the expected results of the MRCD, i.e., when two or three bits read from Loc 1, Loc 2, and Loc 3 are the same, this bit is shown in MRCD, and it is the result of Step 370.

Figure 5:
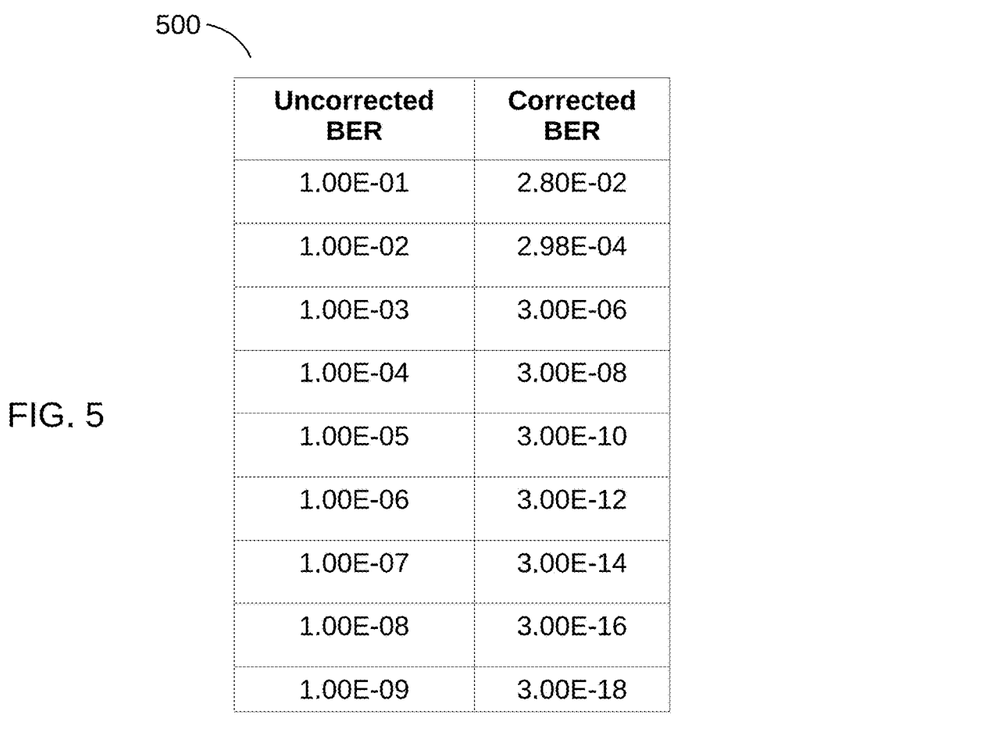
FIG. 5 shows a table with the improvement in BER.

FIG. 5 shows a table 500 with the improvement in BER. Method 300 and other implementations that use the majority rule check for three copies of the data show a corrected BER that is significantly better than the uncorrected BER, i.e., the BER of raw data read from memory array 130. The corrected BER (denoted here as cBER) can be calculated from the uncorrected BER (here denoted as uBER) as follows:

$$cBER=3\times(uBER)^2\times(1-uBER)+(uBER)^3$$

Figure 6:
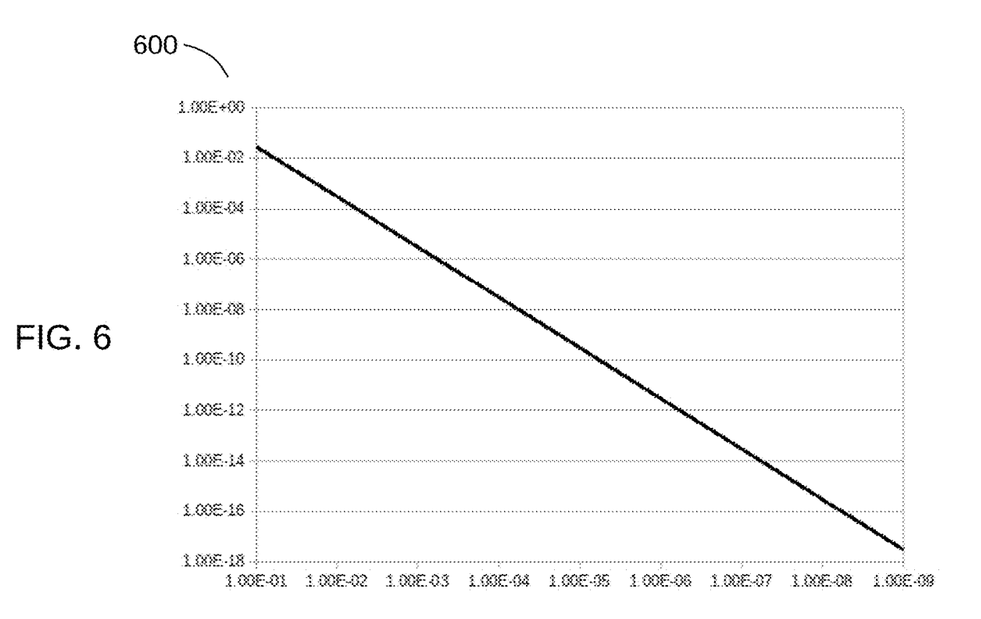
FIG. 6 shows a log-log chart of the improvement in BER.

FIG. 6 shows a log-log chart 600 of the improvement in BER. The results from table 500 plot as an almost straight line, indicating that the performance increases exponentially with the quality of storage of memory array 130.

Figure 7:
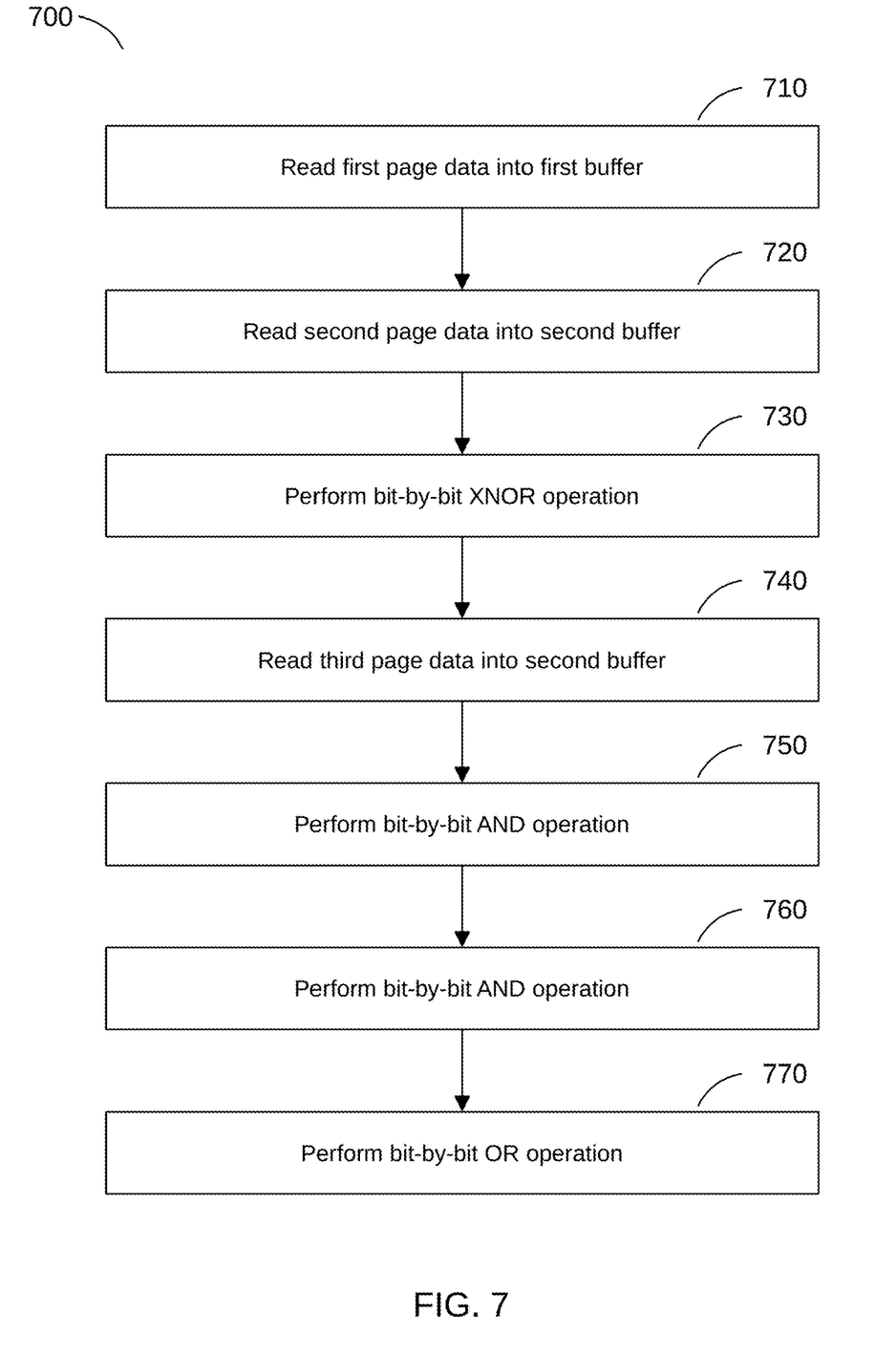
FIG. 7 illustrates another method to reduce the BER in the memory IC of FIG. 1.

FIG. 7 illustrates another method 700 to reduce the BER in the memory IC 120 of FIG. 1. The example method is used in page buffer that includes three data buffers: a first data buffer (L1), a second data buffer (L2) and a third data buffer (L3). The first data buffer L1 may include all or a selection of bit data buffers D1 in the one-bit wide buffer cells in the page buffer. The second data buffer L2 may include all or a selection of bit data buffers D2 in the one-bit wide buffer cells in the page buffer, etc. Method 700 comprises the following steps:

Step 710—reading first page data into the first data buffer L1. The implementation reads the first page data from a first location in memory array 130.

Step 720—reading second page data into the second data buffer L2. The implementation reads the second page data from a second location in memory array 130.

Step 730—performing a bitwise XNOR operation on the first page data and the second page data, and storing the result of the bitwise XNOR operation in the third data buffer L2. Thus, for each bit bx:

$$b3=XNOR(b1,b2)$$

Step 740—reading third page data into the second data buffer L2. The implementation reads the third page data from a third location in memory array 130.

Step 750—performing a bitwise AND operation on the result in the third data buffer L3 and the first page data stored in the first buffer L1, and storing the result of the bitwise AND operation in the first data buffer L1. Thus, for each bit bx:

$$b1=AND(b1,b3)$$

Step 760—performing a bitwise AND operation on the third page data from the second data buffer L2 and inverted bits from the values stored in the third data buffer L3, and storing the result of the bitwise AND operation in the second data buffer L2. Thus, for each bit bx:

$$b2=AND(b2,NOT(b3))$$

Step 770—performing a bitwise OR operation on the result of the bitwise AND operation stored in the first data buffer L1 and the result of the bitwise AND operation stored in the second data buffer L2, and storing the result in the first data buffer L1. The result of the OR operation represents the error-corrected data obtained from performing the majority function. Thus, for each bit bx:

$$b1=OR(b1,b2)$$

Some implementations may store results in different data buffers than shown in the above steps, and other implementations may skip intermediate storage and retrieve values from memory directly.

While method 300 and method 700 have similar steps in a different order, other implementations may have different steps in different orders, all producing the same result of the majority function performed on the bits d1, d2, d3 from the first, second, and third location, respectively:

$$Maj(d_2, d_2, d_3) = \text{round\_down}\left(\frac{1}{2} + \frac{d_1 + d_2 + d_3}{3}\right)$$

Figure 8:
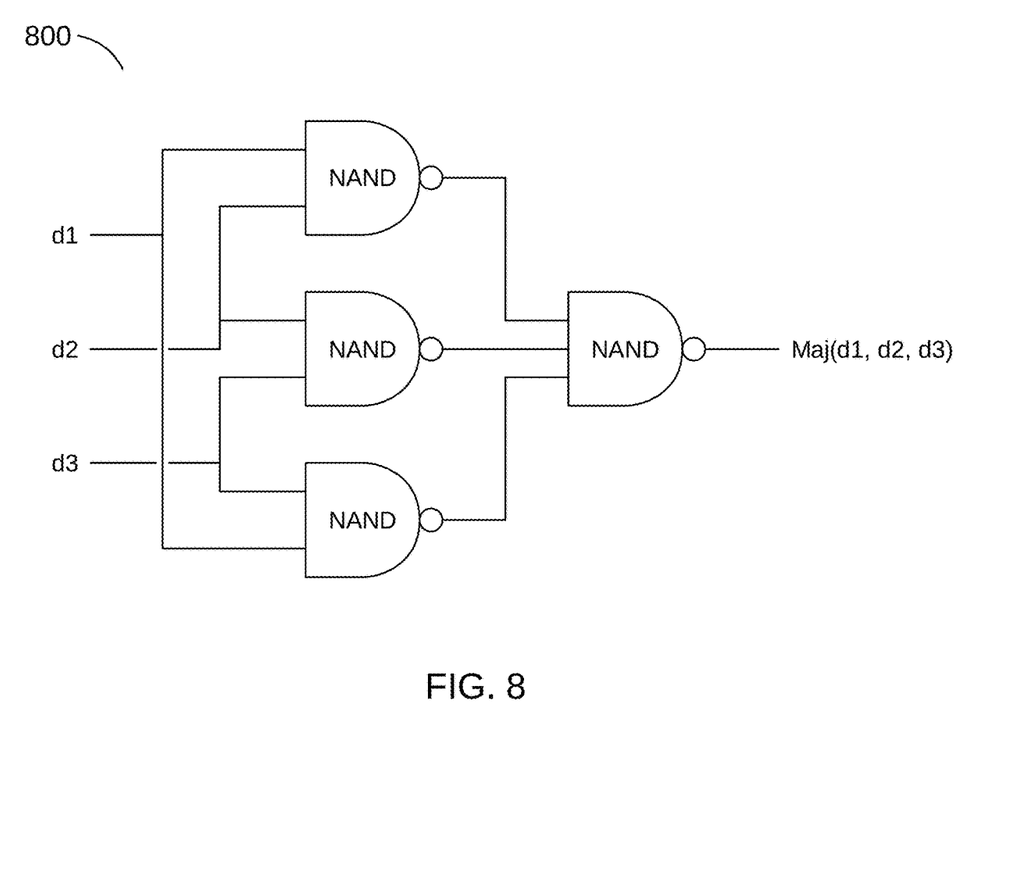
FIG. 8 shows an example combinational logic circuit for performing the majority function on three bits read from the first, second, and third location.

FIG. 8 shows an example combinational logic circuit 800 for performing the majority function on three bits read from the first, second, and third location. Implementations may use combinational logic equivalent to or including combinational logic circuit 800 to perform the majority function on bits d1, d2, d3 read from the first, second, and third location. Many combinational logic circuits can be generated, for example by a silicon compiler, whose functionality is equivalent to, or includes, the functionality of FIG. 8. All such circuits are within the ambit and scope of the technology disclosed herein.

A number of flowcharts illustrating logic executed by a memory controller or by memory device are described herein. The logic can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the technology, and it will be understood that numerous additional steps for accomplishing other functions can be performed before, after and between those shown.

While the technology is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

What is claimed is:

1. An integrated circuit (IC), comprising:
a memory array including one or more arrays of memory cells;
an address register configured to:
hold at least one address of a securely stored file and output three or more addresses of the securely stored file; and
computation-in-memory (CIM) logic coupled with the memory array and configured to perform a majority function on three or more bits of the securely stored file, wherein the three or more bits are redundantly stored in the memory array in three or more different locations, associated with the three or more addresses, in the memory array.

2. The IC of claim 1, wherein the CIM logic comprises dedicated bitwise logic to perform the majority function.

3. The IC of claim 1, further comprising:
an input/output interface;
a page buffer including multiple bitwise buffer cells, each including:
a first bit data buffer;
a second bit data buffer; and
a third bit data buffer; and
the CIM logic, including logic circuitry to perform at least parts of the majority function on bits stored in the first bit data buffers, the second bit data buffers, and/or the third bit data buffers, wherein the first bit data buffers of the multiple bitwise buffer cells jointly form a first data buffer, the second bit data buffers of the multiple bitwise buffer cells jointly form a second data buffer, and the third bit data buffers of the multiple bitwise buffer cells jointly form a third data buffer; and
control circuits coupled with the input/output interface, the memory array, and the page buffer, and configured to:
receive control signals from the input/output interface; and
in response to a read data redundantly control signal, read data from the three or more different locations in the memory array, and perform the majority function on the data read from the three or more different locations to obtain error-corrected data, and copy the error-corrected data to the input/output interface or use the error-corrected data for a new CIM logic operation.

4. The IC of claim 3, wherein the control circuits are configured to, in response to a write data redundantly control signal, copy data from the input/output interface to each of the three or more different locations in the memory array.

5. The IC of claim 3, wherein the control circuits are configured to, in response to the read data redundantly control signal, perform the majority function to provide error-corrected data.

6. The IC of claim 3, further comprising a cache memory coupled between the page buffer and the input/output interface.

7. The IC of claim 3, wherein the control circuits are configured to output signals to cause the CIM logic perform operations including:
reading data from a first location in the memory array and storing the data read from the first location in the first data buffer;
reading data from a second location in the memory array and storing the data read from the second location in the second data buffer;
performing a bitwise XNOR operation on the data stored in the first data buffer and the data stored in the second data buffer, and storing data resulting from the bitwise XNOR operation in the third data buffer;
performing a first bitwise AND operation on the data stored in the third data buffer and the data stored in the first data buffer, and storing data resulting from the first bitwise AND operation in the first data buffer;
reading data from a third location in the memory array and storing the data read from the third location in the second data buffer;
performing a second bitwise AND operation on the data stored in the second data buffer and inverted bits from the data stored in the third data buffer and storing data resulting from the second bitwise AND operation in the second data buffer; and
performing a bitwise OR operation on the data stored in the first data buffer and the data stored in the second data buffer, and using data resulting from the bitwise OR operation as the error-corrected data.

8. The IC of claim 3, wherein the control circuits are configured to output signals to cause the CIM logic perform operations including:
reading data from a first location in the memory array and storing the data read from the first location in the first data buffer;
reading data from a second location in the memory array and storing the data read from the second location in the second data buffer;
performing a bitwise XNOR operation on the data stored in the first data buffer and the data stored in the second data buffer, and storing data resulting from the bitwise XNOR operation in the third data buffer;
reading data from a third location in the memory array and storing the data read from the third location in the second data buffer;
performing a first bitwise AND operation on the data stored in the third data buffer and the data stored in the first data buffer, and storing data resulting from the first bitwise AND operation in the first data buffer;
performing a second bitwise AND operation on the data stored in the second data buffer and inverted bits from the data stored in the third data buffer, and storing data resulting from the second bitwise AND operation in the second data buffer; and
performing a bitwise OR operation on the data stored in the first data buffer and the data stored in the second data buffer, and using data resulting from the bitwise OR operation as the error-corrected data.

9. A method of redundantly storing data in a memory array of an integrated circuit (IC), the memory array including one or more arrays of memory cells, the IC including an address register and computation-in-memory (CIM) logic coupled with the memory array, the method comprising:
holding, in the address register, at least one address of a securely stored file;
outputting, by the address register, three or more addresses of the securely stored file; and implementing the CIM logic to perform a majority function on three or more bits of the securely stored file to redundantly store the three or more bits in the memory array in three or more different locations, associated with the three or more addresses, in the memory array.

10. The method of claim 9, wherein the CIM logic comprises dedicated bitwise logic to perform the majority function.

11. The method of claim 9, wherein:
the IC includes an input/output interface, and a page buffer including multiple bitwise buffer cells, each including (i) a first bit data buffer, (ii) a second bit data buffer and (iii) a third bit data buffer;
the method further includes implementing the CIM logic to perform at least parts of the majority function on bits stored in the first bit data buffers, the second bit data buffers, and/or the third bit data buffers, wherein the first bit data buffers of the multiple bitwise buffer cells jointly form a first data buffer, the second bit data buffers of the multiple bitwise buffer cells jointly form a second data buffer, and the third bit data buffers of the multiple bitwise buffer cells jointly form a third data buffer; and
the method further includes implementing control circuits coupled with the input/output interface, the memory array, and the page buffer, to perform operations comprising:
receiving control signals from the input/output interface; and
in response to a read data redundantly control signal, reading data from the three or more different locations in the memory array, and performing the majority function on the data read from the three or more different locations to obtain error-corrected data, and copying the error-corrected data to the input/output interface or using the error-corrected data for a CIM operation.

12. The method of claim 11, wherein method further comprises implementing control circuits to, in response to a write data redundantly control signal, copy data from the input/output interface to each of the three or more different locations in the memory array.

13. The method of claim 11, wherein the method further comprises implementing the control circuits to, in response to the read data redundantly control signal, perform the majority function to provide error-corrected data.

14. The method of claim 9, further comprising:
reading data from a first location in the memory array and storing the data read from the first location in a first data buffer;
reading data from a second location in the memory array and storing the data read from the second location in a second data buffer;
performing a bitwise XNOR operation on the data stored in the first data buffer and the data stored in the second data buffer, and storing data resulting from the bitwise XNOR operation in a third data buffer;
performing a first bitwise AND operation on the data stored in the third data buffer and the data stored in the first data buffer, and storing data resulting from the first bitwise AND operation in the first data buffer;
reading data from a third location in the memory array and storing the data read from the third location in the second data buffer;
performing a second bitwise AND operation on the data stored in the second data buffer and inverted bits from the data stored in the third data buffer, and storing data resulting from the second bitwise AND operation in the second data buffer; and
performing a bitwise OR operation on the data stored in the first data buffer and the data stored in the second data buffer, and using data resulting from the bitwise OR operation as the error-corrected data.

15. The method of claim 11, further comprising:
reading data from a first location in the memory array and storing the data read from the first location in a first data buffer;
reading data from a second location in the memory array and storing the data read from the second location in a second data buffer;
performing a bitwise XNOR operation on the data stored in the first data buffer and the data stored in the second data buffer, and storing data resulting from the bitwise XNOR operation in a third data buffer;
reading data from a third location in the memory array and storing the data read from the third location in the second data buffer;
performing a first bitwise AND operation on the data stored in the third data buffer and the data stored in the first data buffer, and storing data resulting from the first bitwise AND operation in the first data buffer;
performing a second bitwise AND operation on the data stored in the second data buffer and inverted bits from the data stored in the third data buffer, and storing data resulting from the second bitwise AND operation in the second data buffer; and
performing a bitwise OR operation on the data stored in the first data buffer and the data stored in the second data buffer, and using data resulting from the bitwise OR operation as the error-corrected data.

16. A method to obtain error-corrected data from data redundantly stored in a memory in a first location, a second location, and a third location, the method comprising:
reading data from the first location in the memory and storing the data read from the first location in a first data buffer;
reading data from the second location in the memory and storing the data read from the first location in a second data buffer;
performing a bitwise XNOR operation on the data stored in the first data buffer and the data stored in the second data buffer, and storing data resulting from the bitwise XNOR operation in a third data buffer;
performing a first bitwise AND operation on the data stored in the third data buffer and the data stored in the first data buffer, and storing data resulting from the first bitwise AND operation in the first data buffer;
reading data from the third location in the memory and storing the data read from the third location in the second data buffer;
performing a second bitwise AND operation on the data stored in the second data buffer and inverted bits from the data stored in the third data buffer, and storing data resulting from the second bitwise AND operation in the second data buffer; and
performing a bitwise OR operation on the data stored in the first data buffer and the data stored in the second data buffer to obtain the error-corrected data.

17. The method of claim 16, wherein the method is performed by computation-in-memory (CIM) logic of an integrated circuit (IC).

18. The method of claim 17, wherein the memory is located within the IC.

19. The method of claim 16, wherein the first data buffer is formed of multiple first bit data buffers of multiple bitwise buffer cells of a page butter, the second data buffer is formed of multiple second bit data buffers of multiple bitwise buffer cells of the page buffer and the third data buffer is formed of multiple third bit data buffers of multiple bitwise buffer cells of the page buffer.

\* \* \* \* \*